(12) United States Patent
Haynor et al.

(10) Patent No.: US 11,942,091 B2
(45) Date of Patent: Mar. 26, 2024

(54) ALPHANUMERIC SEQUENCE BIASING FOR AUTOMATIC SPEECH RECOGNITION USING A GRAMMAR AND A SPELLER FINITE STATE TRANSDUCER

(71) Applicant: Google LLC, Mountain View, CA (US)

(72) Inventors: Benjamin Haynor, New York, NY (US); Petar Aleksic, Jersey City, NJ (US)

(73) Assignee: GOOGLE LLC, Mountain View, CA (US)

( * ) Notice: Subject to any disclaimer, the term of this patent is extended or adjusted under 35 U.S.C. 154(b) by 587 days.

(21) Appl. No.: 17/251,465

(22) PCT Filed: Jan. 17, 2020

(86) PCT No.: PCT/US2020/014141
§ 371 (c)(1),
(2) Date: Dec. 11, 2020

(87) PCT Pub. No.: WO2021/145893
PCT Pub. Date: Jul. 22, 2021

(65) Prior Publication Data
US 2022/0013126 A1    Jan. 13, 2022

(51) Int. Cl.
*G10L 15/26* (2006.01)
*G10L 15/16* (2006.01)
(Continued)

(52) U.S. Cl.
CPC .............. *G10L 15/26* (2013.01); *G10L 15/16* (2013.01); *G10L 15/193* (2013.01); *G10L 15/22* (2013.01); *G10L 15/30* (2013.01)

(58) Field of Classification Search
CPC ....... G10L 15/22; G10L 15/30; G10L 15/193; G10L 15/26
See application file for complete search history.

(56) References Cited

U.S. PATENT DOCUMENTS

| 8,972,243 B1 | 3/2015 | Strom et al. |
| 9,886,946 B2 | 2/2018 | Moreno-Mengibar et al. |

(Continued)

FOREIGN PATENT DOCUMENTS

| JP | 2000267691 | 9/2000 |
| JP | 2010066493 | 3/2010 |

(Continued)

OTHER PUBLICATIONS

Serrino, J. et al., "Contextual Recovery of Out-of-Lattice Named Entities in Automatic Speech Recognition;" Interspeech 2019; 5 pages; Sep. 15, 2019.

(Continued)

*Primary Examiner* — Farzad Kazeminezhad
(74) *Attorney, Agent, or Firm* — Gray Ice Higdon

(57) ABSTRACT

Speech processing techniques are disclosed that enable determining a text representation of alphanumeric sequences in captured audio data. Various implementations include determining a contextual biasing finite state transducer (FST) based on contextual information corresponding to the captured audio data. Additional or alternative implementations include modifying probabilities of one or more candidate recognitions of the alphanumeric sequence using the contextual biasing FST, where the FST further comprises a grammar as well as a speller finite state transducer.

19 Claims, 9 Drawing Sheets

(51) Int. Cl.
  *G10L 15/193* (2013.01)
  *G10L 15/22* (2006.01)
  *G10L 15/30* (2013.01)

(56) References Cited

U.S. PATENT DOCUMENTS

| | | | |
|---|---|---|---|
| 9,971,765 | B2 | 5/2018 | Li et al. |
| 10,176,802 | B1 | 1/2019 | Ladhak et al. |
| 11,232,799 | B1* | 1/2022 | Birthare ................. G10L 15/30 |
| 2015/0194149 | A1 | 7/2015 | Faizakof et al. |
| 2020/0349923 | A1* | 11/2020 | Hu ........................ G10L 15/193 |
| 2020/0357388 | A1* | 11/2020 | Zhao .................... G10L 15/183 |
| 2021/0035566 | A1* | 2/2021 | Ponniah .................. G10L 15/22 |

FOREIGN PATENT DOCUMENTS

| | | |
|---|---|---|
| JP | 2017219769 | 12/2017 |
| JP | 2019020597 | 2/2019 |

OTHER PUBLICATIONS

European Patent Office; International Search Report and Written Opinion of PCT Ser. No. PCT/US2020/014141; 11 pages; dated Oct. 15, 2020.

Williams, I. et al., "Contextual Speech Recognition in End-to-End Neural Network Systems Using Beam Search;" Proceedings of Interspeech 2018; 5 pages; Sep. 2, 2018.

Intellectual Property India, First Examination Report issued in Application 202227038620; 7 pages; dated Oct. 20, 2022.

European Patent Office; Intention to Grant issued in Application No. 20707891.6; 55 pages; dated May 19, 2023.

\* cited by examiner

ALPHANUMERIC SEQUENCE BIASING FOR AUTOMATIC SPEECH RECOGNITION USING A GRAMMAR AND A SPELLER FINITE STATE TRANSDUCER

BACKGROUND

Automatic speech recognition (ASR) techniques convert natural language input into text. For example, audio data captured using a microphone can be converted into text. ASR systems can include an ASR model for use in generating a set of candidate recognitions. The ASR system can select generated text from the set of candidate recognitions.

Humans may engage in human-to-computer dialog with interactive software applications referred to herein as "automated assistants" (also referred to as "digital agents", "chatbots", "interactive personal assistants", "intelligent personal assistants", "assistant applications", "conversational agents", etc.). For example, humans (which when they interact with automated assistants may be referred to as "users") may provide commands and/or requests to an automated assistant using spoken natural language input (i.e., utterances), which may in some cases be converted into text (e.g., converted into text using ASR techniques) and then processed.

SUMMARY

Implementations disclosed herein are directed towards determining a text representation of a spoken utterance, that includes an alphanumeric sequence, using contextual biasing finite state transducers (FSTs). Contextual biasing FSTs are also referred to herein as contextual FSTs, contextual written domain alphanumeric grammar FSTs, and written domain alphanumeric grammar FSTs. As one example, the spoken utterance of "tell me about my flight to DAY" includes the alphanumeric sequence 'DAY' that indicates the Dayton International Airport. Alphanumeric sequences, as used herein, can include a combination of alphabet characters and/or numeric characters. In some implementations, alphanumeric sequences, as used herein, have an expected character length, an expected pattern of alphabet characters and/or numeric characters, and/or one or more additional expected characteristics. For example, an airport code is an alphanumeric sequence with an expected length of three characters, and with an expected pattern of a first alphabet character, a second alphabet character, and a third alphabet character. As another example, a tracking number is an alphanumeric sequence with an expected length and/or an expected pattern of alphabet characters and/or numeric characters. Alphanumeric sequences can include tracking numbers, airport codes, radio station call numbers, personal identification numbers, times, zip codes, phone numbers, and/or additional or alternative sequences.

An automatic speech recognition (ASR) system can be used to generate the text representation of the spoken utterance. In some implementations, the ASR system can be trained using a set of training instances, where the set of training instances does not include the alphanumeric sequence. Additionally or alternatively, the ASR system can be trained using a set of training instances, where the alphanumeric sequence occurs a number of times below a threshold value in the set of training instances. In other words, the use of contextual biasing FSTs in accordance with implementations described herein can increase the recognition of alphanumeric sequences not present in the training data and/or infrequently encountered in the training data used to train the ASR system, thus increasing the accuracy of the ASR system without necessitating additional training of the ASR system based on such alphanumeric sequences.

In some implementations, the ASR system can process the spoken utterance using an ASR model portion of the ASR system to generate one or more candidate recognitions of the spoken utterance. A variety of ASR models can be used in generating candidate recognition(s) of the spoken utterance including a recurrent neural network (RNN) model, a recurrent neural network-transformer (RNN-T) model, a sequence to sequence model, a listen attend spell (LAS) model, and/or one or more additional models for use in generating candidate recognitions of spoken utterances.

The ASR system can rescore the probabilities of the one or more candidate recognitions (e.g., increase and/or decrease probabilities of the candidate recognition(s)). The candidate recognitions and/or the rescored candidate recognitions can be used by the ASR system to generate the text representation of the spoken utterance. The ASR system can include a beam search portion used in rescoring the candidate recognitions. In some implementations, the ASR system can modify the beam search portion using contextual biasing FST(s). In some implementations, the beam search portion can iteratively interact with the ASR model in building candidate recognition(s) one unit at a time. For example, the ASR system can include a RNN-T model as the ASR model. The ASR system modify the candidate recognition(s) generated using the RNN-T model using the beam search portion, where the beam search portion is modified using the contextual FST(s) via shallow fusion.

The contextual biasing FST can be selected using a FST engine based on contextual information corresponding to the spoken utterance. Put another way, the contextual information can be used, directly or indirectly, in selecting one or more contextual biasing FSTs that are mapped to the contextual information. In some implementations, the spoken utterance can be processed using a context engine to determine relevant contextual information. Additionally or alternatively, additional information can be processed using the context engine to determine the contextual information. Additional information can include, for example: one or more previous turns in a dialog between a user and a computing system that precede the spoken utterance; information about the user stored in a user profile; information about the computing system; information about one or more networked hardware devices (e.g., a networked smart thermostat, a networked smart oven, a networked camera, etc.); and/or additional information relating to the context of the utterance. For example, contextual information relating to thermostat temperature can be determined based on a spoken utterance of "turn the temperature up to 72 degrees". For instance, the contextual information relating to thermostat temperature can be based on presence, in the spoken utterance, of certain term(s) that are mapped (individually or collectively) to thermostat temperature, such as "turn", "temperature", "up" and/or "degrees". Additionally or alternatively, additional information related to a networked smart thermostat can be used in determining the contextual information. For instance, additional information can be utilized based on the networked smart thermostat being linked with a device via which the spoken utterance is received. In the illustrated example, the spoken utterance of "turn the temperature up to 72 degrees" and the additional information about the networked smart thermostat can be processed using the context engine to determine the thermostat temperature contextual information. This contextual information can be processed using the FST engine to select the temperature contextual biasing FST. The temperature contextual biasing FST can have an expected length of one or two digits, an expected structure of a first numeric character followed by a second numeric character, and an expected range of values (e.g., an expected range between 50 to 90). In some implementations, the FST engine can select multiple contextual biasing FSTs related to the contextual information. For instance, the FST engine can select a Fahrenheit temperature contextual biasing FST and a Celsius temperature contextual biasing FST. The Fahrenheit temperature contextual biasing FST can have an expected range of Fahrenheit temperatures while the Celsius contextual biasing FST can have a distinct expected range of Celsius temperatures.

In many implementations, a contextual biasing FST can be generated based on an alphanumeric grammar FST. The alphanumeric grammar FST can accept valid alphanumeric sequences for the type of alphanumeric sequence. For example, an airport code alphanumeric grammar for an airport code alphanumeric sequence can accept a variety of combinations of a three character sequence of a first alphabet character, a second alphabet character, and a third alphabet character. In some implementations, the airport code alphanumeric grammar may only accept the subset of possible three letter combinations which correspond to valid airport codes. In other words, the airport alphanumeric grammar can be constructed to only accept three character sequences of alphabet characters that correspond to an actual airport code instead of accepting all of the over 17,000 potential three character sequences of alphabet characters. In some implementations, an unweighted wordpiece based acceptor grammar can be generated based on the alphanumeric grammar FST and a speller FST, where the speller FST can map wordpieces to their constituent graphemes. The unweighted wordpiece based acceptor grammar can accept valid wordpiece tokenizations of the alphanumeric grammar. For example, an unweighted wordpiece based acceptor grammar can accept "LAX", "L AX", or "LA X" as valid wordpiece tokenizations of the airport code "LAX" indicating the Los Angeles International Airport. Furthermore, in some implementations, a factored FST can be generated by applying a factor operation to the unweighted wordpiece based acceptor grammar, where all paths leading to any given state in the factored FST traverse the same number of arcs. The contextual biasing FST can be generated by applying constant weights per arc to the factored FST. Additionally or alternatively, the contextual biasing FST can be generated by causing failure transitions to be equal to the cumulative weight accumulated up to each state to the factored FST.

Accordingly, various implementations set forth techniques for processing audio data to generate text representations of alphanumeric sequences—and do so in a manner that enables speech recognition to be more efficient and/or accurate. Implementations disclosed herein increase the accuracy of text representations of alphanumeric sequences even when the alphanumeric sequence has a low prior probability (i.e., is infrequently encountered in the training data used to train the ASR system) or is out of vocabulary for the underlying ASR system. In these and other manners, accurate speech recognition can be performed for a given alphanumeric sequence without prior utilization of resources in training the ASR system on multiple (or even any) training examples that include the given alphanumeric sequence. Further, accurately recognizing captured audio data can conserve system resources (e.g., processor cycles, memory, battery power, and/or additional resources of a computing system) by eliminating the need for a user to repeat audio data incorrectly recognized by the system (or manually type a correction to an incorrect recognition). This shortens the duration of user input and the duration of a user-system dialog. Yet further, the user experience can be improved by eliminating the need for the user to repeat audio data incorrectly recognized by the system.

The above description is provided only as an overview of some implementations disclosed herein. These and other implementations of the technology are disclosed in additional detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
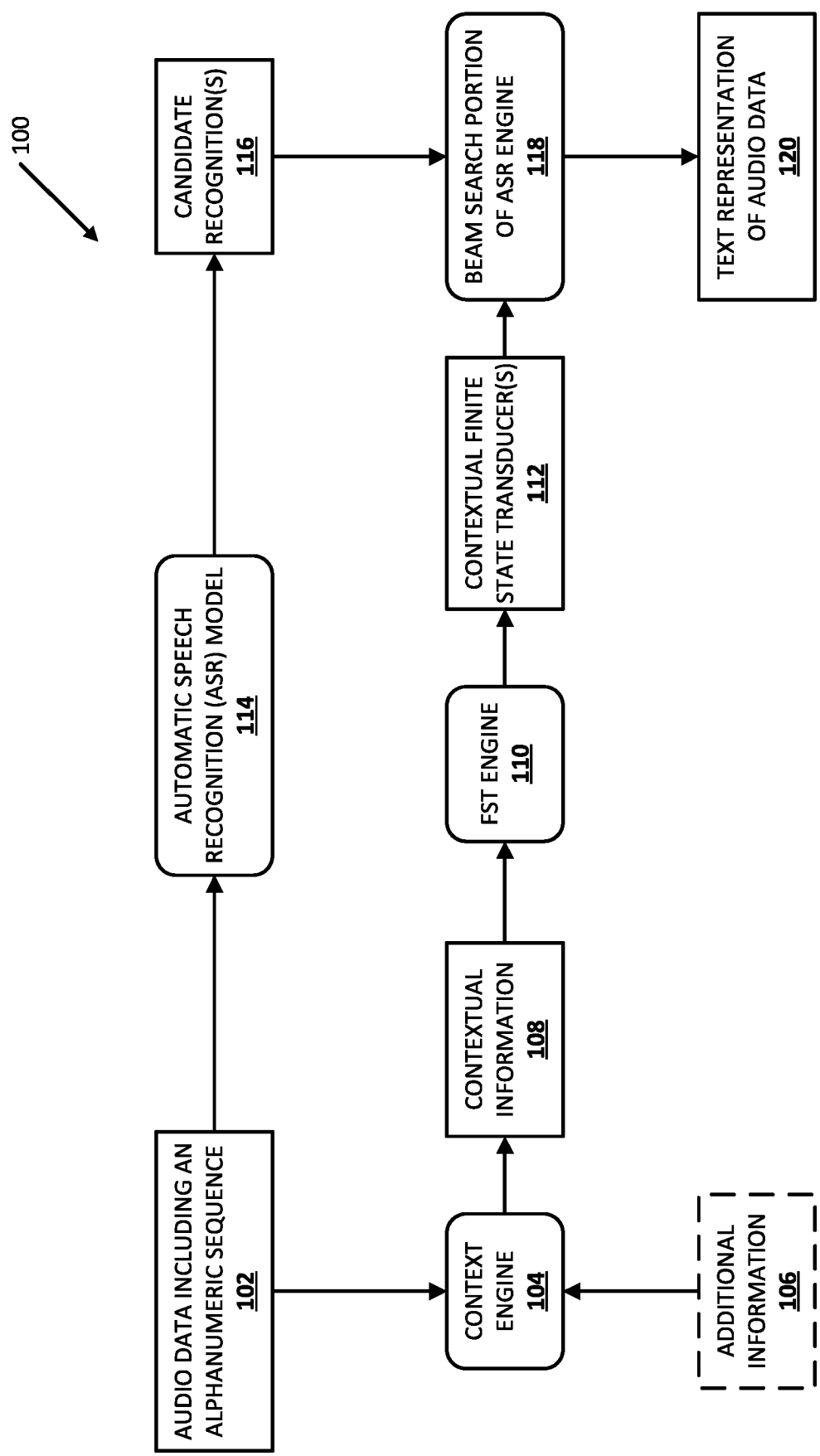
FIG. 1A illustrates an example of generating a text representation of captured audio data in accordance with various implementations disclosed herein.

Accurate recognition of alphanumeric sequences can be crucial for speech recognition applications. For example, a user might want to add a calendar event and might be asked by an automated assistant to say a time, a date, and duration of an event. Implementations disclosed herein are directed towards a contextual speech recognition technique for recognizing alphanumeric entities using shallow fusion between an end-to-end speech recognition system and written domain alphanumeric grammars represented as finite state transducers. An approach is presented for automatic conversion of grammars representing alphanumeric entities in the written domain to finite state transducers that can be used to increase the probability of hypotheses matching these grammars during beam search.

Accurate recognition of alphanumeric sequences is an important task across a number of applications that use automatic speech recognition (ASR). Recognizing alphanumeric sequences such as addresses, times, dates, digit sequences, etc. can be a difficult task that is often needed in specific contexts, such as a dialog context. For example, a user might give a command to a voice controlled digital assistant to set an alarm or calendar event, and in turn be asked to specify the alarm time or calendar event duration. In these kind of contextual scenarios, speech recognition errors can significantly affect user experience.

Given the wide variety of alphanumeric sequence types, it is important to have a flexible ASR system that can easily adapt to new contexts and alphanumeric entity types. It is therefore important to incorporate available contextual information in order to improve ASR accuracy, especially for alphanumeric sequences that are unlikely to be well represented in training data.

There may be various relevant sources of contextual information. For example a location can be used as a contextual signal as zip codes and phone numbers in different countries might have different formats. Similarly, in a dialog turn a user might be asked to enter digit sequences of a specific length. An ASR system that fails to take advantage of this contextual knowledge can potentially provide poor recognition accuracy of numeric entities.

Contextual information can be used to improve recognition accuracy of conventional ASR systems. Various contextual signals (e.g., location, dialog states, surface, etc.) can be utilized in order to adapt ASR systems on-the-fly to a particular context. On-the-fly rescoring and finite state transducer contextual models can be used in contextual ASR systems. Conventional ASR systems have addressed improving quality on numeric sequences using verbalizers and class based systems together with contextual information.

Similarly, contextual information can be utilized in end to end (E2E) ASR systems. For example, a general approach to contextual speech recognition in E2E ASR systems can utilize a shallow fusion language model. An additional and/or alternative technique can include adapting the inference process and take advantage of contextual signals by adjusting the output likelihoods at each step in the beam search. The proposed method can be evaluated on a Listen Attend Spell (LAS) E2E model showing its effectiveness at incorporating context into the prediction of an E2E system.

Furthermore, techniques can minimize search errors which can be common due to the shallow beam used in E2E speech recognition systems. The system can be evaluated using a recurrent neural network transducer (RNN-T). During beam search, the output likelihoods are rescored by an external model before pruning. The external model can provide probabilities for wordpiece outputs, either positive or negative weights. To reduce search errors, the system increases probabilities of prefixes of words present in contextual models, and retracts the probabilities for failed matches. With this method, the probabilities of paths that could potentially lead to a word from a contextual model are increased during beam search. If a prefix stops matching, the score is retracted. This technique has proven promising in a wide variety of contextual speech applications, including communication and media tasks.

A limitation in this system is that it can only build contextual models from a list of phrases. In order to support contextual ASR for a numeric class, e.g. a 10-digit numeric sequence, all 10-digit numbers would need to be enumerated. This is prohibitively computationally expensive (e.g., memory wise and/or processor wise) for classes with large numbers of elements (e.g. zip codes, phone numbers, etc.).

An alternative technique for contextual speech recognition in E2E systems, Contextual Listen, Attend and Spell (CLAS) can be utilized. However, the CLAS technique scales poorly to large numbers of phrases.

Various approaches can be utilized for improving alphanumeric entity recognition in E2E systems. In a written text-to-speech (US) system, a US system is used to generate synthetic queries containing alphanumeric entities to be used for training. This approach showed improvements on test sets generated using similar queries and voices to the generated training data, but resulted in a small regression on general test sets. While these approaches may be useful for general purpose numeric entity recognition, they are not modular and/or scalable, and they do not address contextual alphanumeric entity recognition scenarios, such as a user responding to a prompt for a time.

As E2E systems become competitive with conventional models, it is beneficial to ensure that these systems have comparable recognition performance on alphanumeric entities. E2E ASR systems do not utilize explicit verbalizers or lexicons and have only limited contextual ASR capabilities, so they might not perform as well on certain classes of alphanumeric entities that are not well represented in E2E model training data and are needed only in certain contexts, such as alphanumeric entities with especially long tail numeric entities with complex verbalization rules.

Various implementations are directed towards contextual speech recognition techniques for recognizing alphanumeric entities using shallow fusion between an E2E speech recognizer and written domain alphanumeric grammars represented as finite state transducers. An approach is provided for automatic conversion of grammars representing alphanumeric entities in the written domain to FSTs that can be used to increase the probability of hypotheses matching these grammars during beam search in E2E speech recognition systems.

An E2E RNN-T based ASR system can be utilized in some implementations. Contextual ASR can be achieved by fusing a wordpiece based RNN-T with a contextual FST during beam search. Techniques describe herein introduce a technique for adding alphanumeric context to E2E ASR systems. This technique addresses building alphanumeric contextual FSTs from numeric grammars and integrating them into a contextual E2E ASR system.

An alphanumeric grammar can be processed to generate a corresponding alphanumeric grammar based contextual FST. The resulting contextual FSTs can be stored in an alphanumeric contextual FST inventory. At recognition time, contextual information can be analyzed in order to fetch contextually relevant FSTs from this inventory. These FSTs provide weights which are interpolated with the RNN-T weights during beam search to increase the probability of hypotheses matching the given numeric grammar.

Contextual information used in order to determine if an alphanumeric contextual FST should be fetched can be, for example, a particular dialog state. For example, if a user was prompted for an alarm time, the time numeric contextual FST can be fetched from the inventory. Similarly, contextual information could be the type of device the user is using. If the user is using a smart radio system, the radio station contextual FST will be fetched and used for contextual ASR.

While techniques are described herein using precompiled grammars, it is also possible to convert alphanumeric grammars to alphanumeric contextual FSTs on-the-fly. This might be particularly useful for supporting custom, client provided alphanumeric grammars, specified on-the-fly through a specific API.

To build a contextual FST for a particular type of alphanumeric entity, various implementations begin with a written domain alphanumeric grammar. The technique is illustrated with an example of a simple grammar that accepts the strings "200" or "202". In general, alphanumeric grammars could be complex, representing, for instance, a time, a percentage, a digit sequence, etc. The written domain alphanumeric grammar is denoted as G. The character _ is used to denote the start of a word.

In order to be used for contextual ASR in an E2E RNN-T ASR system, the alphanumeric grammar FST needs to be converted to wordpieces using a technique similar to a "speller" technique. The speller FST S, transduces from wordpieces to the constituent graphemes of that wordpiece. Using S, an unweighted wordpiece based acceptor grammar U can be created using the FST operations in Equation 1. The unweighted wordpiece based acceptor grammar FST accepts all valid wordpiece level tokenizations of strings in the grammar G. In the illustrated example, the number "_200" can be tokenized into the wordpieces "_20 0", "_2 0 0", or "2 00".

$$U = \min(\det \det(\mathrm{project}(S \circ G))) \tag{1}$$

In order to integrate with existing contextual ASR systems, the contextual FST can have failure transitions to subtract penalties for partial matches. Therefore, all paths leading to the same state should have the same cumulative weight. Applying a constant weight per matching arc in the contextual FST can result in a problem of ambiguous failure weights. To solve this problem, the FactorFST operation can be used with factor weight one to ensure that at any state, the cumulative path weight to that state is the same. Note that at any state, the cumulative number of arcs traversed to reach that state is now the same, independent of the path taken to reach that state. An alternative solution to the factor operation would be to create a tree FST. However, in some implementations, such a tree can grow exponentially large for simple grammars such as N-digit numbers.

Finally, weights and failure transitions are applied to the factored FST resulting in the weighted contextual FST C. In this example, a constant weight per arc can be applied, however other strategies might apply a weight as a function of the number of arcs traversed to reach a given state. Both strategies result in a constant cumulative path weight at any given state, resulting in consistent weights for failure transitions. Note that for this FST, different tokenizations of the same numeric sequence get different weights. Additionally or alternatively, weights can be applied as a function of the grapheme depth (the cumulative number of graphemes required to reach a state in the FST), which would result in all paths that spell the same numeric sequence having equal weight, a potentially desirable property for some use cases.

The weights in the contextual FST can be used to modify probabilities during beam search according to Equation 2. The log probability of a label y, denoted s(y), is modified by the factor $\alpha \log \log p_c(y)$, where $\alpha$ is an interpolation weight, and $\log \log p_c(y)$ is the weight provided by the contextual FST, in the case where the label y matches an arc in C. If the label y does not match an arc in C the log probability s(y) is unmodified.

$$s(y) = \log \log p(x) - \alpha \log \log p_c(y) \tag{2}$$

The process for building and using contextual FSTs can be summarized as follows: (1) Build an acyclic character based FST G. (2) Construct a "speller" FST S, mapping wordpieces to their constituent graphemes. (3) Use S and G to compute an unweighted wordpiece based acceptor grammar U, as described in Equation 1. (4) Apply the factor operation to produce a factored FST F, to ensure that any path leading to a given state traverses the same number of arcs. (5) Apply constant weights per arc and failure transitions equal to the cumulative weight accumulated up to this point to obtain the contextual biasing FST C. (6) Use the contextual FST to modify probabilities of matching labels during beam search as described in Equation 2.

The preceding paragraphs are provided as an overview of various implementations. Those and other implementation are now described in more detail with respect to the Figures. FIG. 1A illustrates an example of generating a text representation of audio data using contextual biasing finite state transducers in accordance with a variety of implementation. In the illustrated example 100, audio data including one or more alphanumeric sequences 102 is processed using a context engine 104 and an ASR model 114. Audio data 102 can be captured audio data such as spoke natural language captured by a microphone of a client device. Context engine 104 can process audio data 102 to generate contextual information 108 corresponding to the processed audio data. For example, context engine 104 can determine contextual information relating to a flight based on the spoken utterance of "tell me about my flight to DAY", where DAY is an airport code alphanumeric sequence indicating the Dayton International Airport.

In some implementations, context engine 104 can process additional information 106 to generate contextual information 108. Additional information 106 can include one or more previous turns in the user-computing system dialog preceding audio data 102; user information stored in a user profile; client device information; and/or additional information relating to the current dialog session, a previous dialog session, the device, the user, and/or other contextual information. For example, additional information 106 can include a calendar entry indicating a flight to Dayton, Ohio. In some implementations, context engine 104 can process additional information 106 in addition to audio data 102 to generate contextual information 108. For example, context engine 104 can process audio data 102 of "tell me about my flight to DAY" and additional information 106 of a calendar entry indicating a flight to Dayton, Ohio to generate contextual information 108. In some other implementations, context engine 104 can process additional information 106 without processing audio data 102 to generate contextual information 108.

FST engine 110 can process contextual information 108 to determine one or more contextual FSTs 112 corresponding to the contextual information. Contextual FSTs 112 can be used to modify the probabilities of one or more candidate text recognitions 116 of the audio data 102. For example, FST engine 110 can determine an airport code contextual FST 112 based on contextual information 108 indicating a flight.

Additionally or alternatively, audio data 102 can be processed using an ASR engine. For example, audio data 102 can be processed using an ASR model 114 portion of the ASR engine to generate one or more candidate text recognitions 116 of the audio data. ASR model 114 can include a variety of machine learning models including a recurrent neural network (RNN) model, a recurrent neural network-transformer (RNN-T) model, a sequence to sequence model, a listen attend spell (LAS) model, and/or one or more additional models for use in generating candidate recognitions of spoken utterances. Additionally or alternatively, the ASR engine can include a beam search portion which can be utilized in selecting a text representation from the candidate recognitions 116. In some implementations, contextual FST(s) can modify the probabilities of one or more candidate recognitions 116 by modifying the beam search portion of the ASR engine 118. In some of those implementations, contextual FST(s) 112 can be used to modify the beam search portion of the ASR engine 118 via shallow fusion. For example, the airport code contextual FST can be used to increase the probability of candidate text recognition(s) of "to DAY" and/or decrease the probability of candidate text recognition(s) of "today".

Figure 1B:
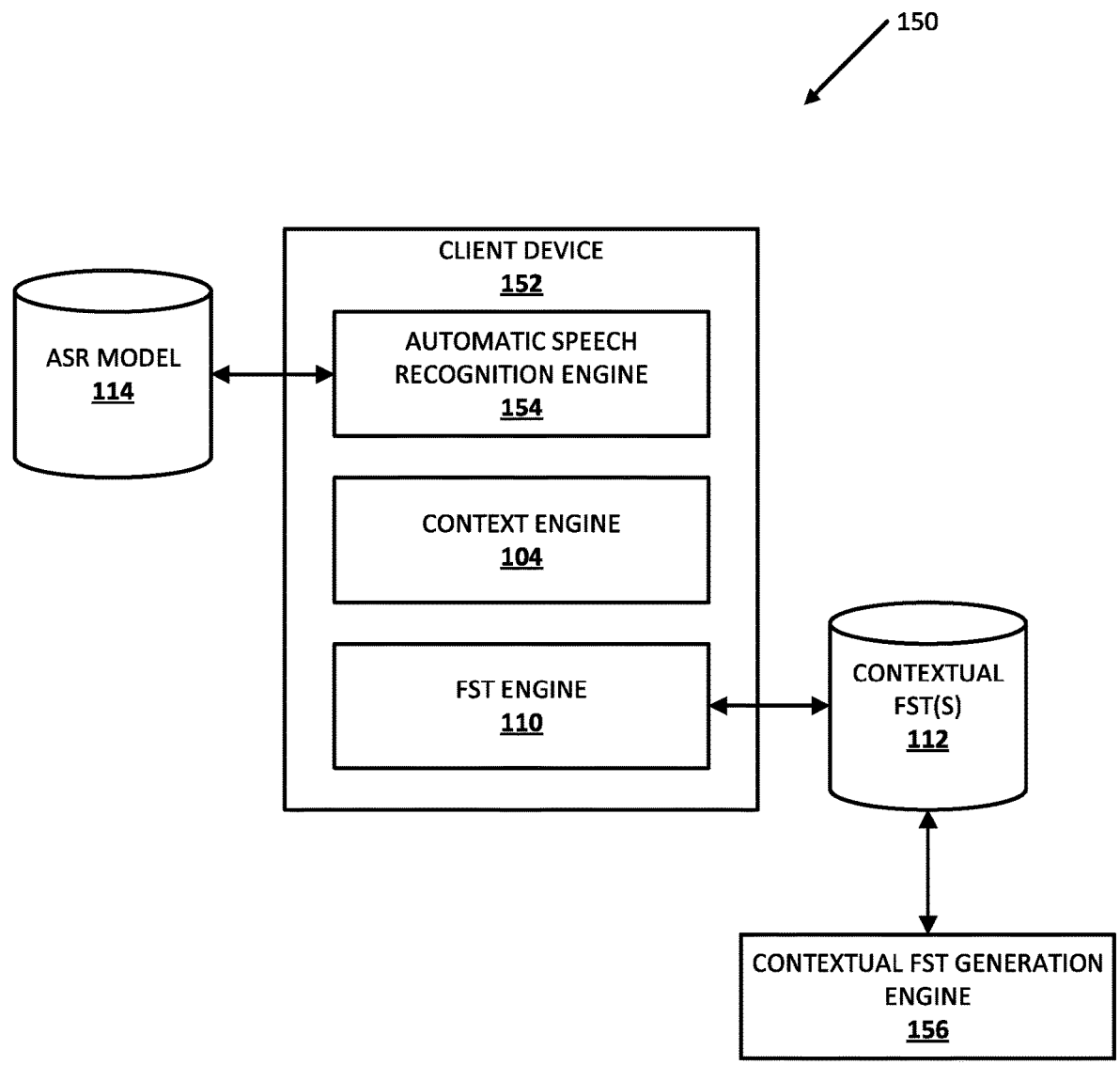
FIG. 1B illustrates an example environment where various implementations disclosed herein can be implemented.

FIG. 1B illustrates an example environment in which various implementations disclosed herein may be implemented. Example environment 150 includes a client device 152. Client device 152 can include ASR engine 115, context engine 104, FST engine 110, additional or alternative engine(s) (not depicted), ASR model 114, and/or additional or alternative model(s) (not depicted). Additionally or alternatively, client device 152 may be associated with contextual FST(s) 112. In many implementations, contextual FST(s) 112 can be stored locally on a client device and can be used to modify the probability of candidate recognitions of spoken utterances, such as a spoken utterance including an alphanumeric sequences, where the candidate recognitions are used in generating a text representation of the spoken utterance. In some implementations, client device 152 may include user interface input/output devices (not depicted), which may include, for example, a physical keyboard, a touch screen (e.g., implementing a virtual keyboard or other textual input mechanisms), a microphone, a camera, a display screen, and/or speaker(s). The user interface input/output devices may be incorporated with one or more client devices 152 of a user. For example, a mobile phone of the user may include the user interface input output devices; a standalone digital assistant hardware device may include the user interface input/output devise; a first computing device may include the user interface input device(s) and a separate computing device may include the user interface output device(s); etc. In some implementations, all or aspects of client device 152 may be implemented on a client device that also contains the user interface input/output devices. In some implementations client device 152 may include an automated assistant (not depicted), and all or aspects of the automated assistant may be implemented on computing device(s) that are separate and remote from the client device that contains the user interface input/output devices (e.g., all or aspects may be implemented "in the cloud"). In some of those implementations, those aspects of the automated assistant may communicate with the computing device via one or more networks such as a local area network (LAN) and/or a wide area network (WAN) (e.g., the Internet).

Some non-limiting examples of client device 152 include one or more of: a desktop computing device, a laptop computing device, a standalone hardware device at least in part dedicated to an automated assistant, a tablet computing device, a mobile phone computing device, a computing device of a vehicle (e.g., an in-vehicle communications system, and in-vehicle entertainment system, an in-vehicle navigation system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided. Client device 152 may include one or more memories for storage of data and software applications, one or more processors for accessing data and executing applications, and other components that facilitate communication over a network. The operations performed by client device 152 may be distributed across multiple computing devices. For example, computing programs running on one or more computers in one or more locations can be coupled to each other through a network.

As illustrated in FIG. 1B, contextual FST generation engine 156 can generate contextual FST(s) 112. In some implementations, contextual FST generation engine 156 can determine a written domain alphanumeric grammar FST which can accept an alphanumeric sequence. For example, alphanumeric grammar FST 200 of FIG. 2 can accept the alphanumeric sequences of "200" and "202". In some implementations alphanumeric grammar FST is an acyclic directed graph. In some implementations, contextual FST generation engine 156 can generate the alphanumeric grammar FST. Additionally or alternatively, contextual FST generation engine 156 can select an alphanumeric grammar FST generated by an additional engine.

Contextual FST generation engine 156 can determine a speller FST which maps wordpieces to the constituent graphemes of that wordpiece. In some implementations, contextual FST generation engine 156 can generate the speller FST. Additionally or alternatively, contextual FST generation engine 156 can select a speller FST generated by an additional engine (not depicted). In some implementations, contextual FST generation engine 156 can generate an unweighted wordpiece based acceptor grammar FST using the speller FST and the alphanumeric grammar FST. The unweighted wordpiece acceptor grammar may accept valid wordpiece level tokenization of strings of the alphanumeric grammar FST. For example, unweighted wordpiece based acceptor grammar 300 of FIG. 3 can accept the strings "2 00", "2 0 0", "2 0 2", "20 2," and "20 0".

In some implementations, contextual FST generation engine 156 can generate a factored FST by applying a factor operation to the unweighted wordpiece based acceptor grammar, where any path leading to a given state in the factored FST traverses the same number of arcs. For example, all paths leading to a given state in factored FST 400 of FIG. 4 have the same length. Furthermore, contextual FST generation engine 156 can generate contextual FST(s) 112 by applying a constant weight per arc to the factored FST. Contextual biasing FST 500 of FIG. 5 is an illustrative example of a contextual FST.

In some implementations, audio data, such as audio data captured using a microphone of client device 152 can be processed using context engine 104 to determine contextual information corresponding to the audio data. Additionally or alternatively, context engine 104 can determine contextual information based on additional information. For example, additional information can include one or more previous turns in the dialog preceding audio data between component(s) of the client device and the user; user information stored in a user profile; client device information; and/or additional information relating to the current dialog session, a previous dialog session, the device, the user, and/or relating to other information. In some implementations, FST engine 110 can select one or more contextual FSTs 112 based on the contextual information. For example, FST engine 110 can select a temperature contextual FST based on contextual information relating to a thermostat temperature.

ASR engine 154 can determine one or more candidate recognitions of the audio data using ASR model 114. For example, ASR model 114 can be a recurrent neural network-transformer (RNN-T) model, and ASR engine can determine a set of candidate recognitions of the audio data using the RNN-T model. In some implementations, ASR engine 154 can include a beam search portion to generate the text representation of the audio data based on the candidate recognitions. Contextual FST(s) 112 selected by FST engine 110 based on context information determined using context engine 104 can be used to modify the probabilities of candidate recognitions during the beam search. In some implementations, the contextual FST(s) 112 can modify the beam search portion via shallow fusion. For example, a contextual FST can increase and/or decrease probabilities of candidate recognitions of an alphanumeric sequence indicated by the contextual FST(s).

Figure 2:
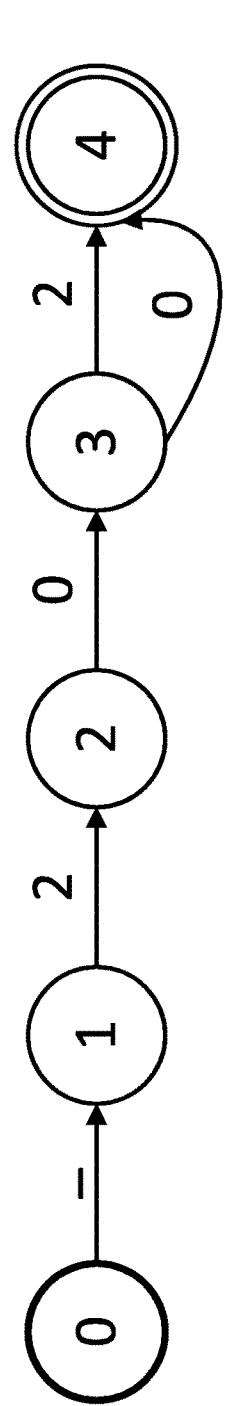
FIG. 2 illustrates an example of an alphanumeric grammar FST in accordance with various implementations disclosed herein.

FIG. 2 illustrates an example of an alphanumeric grammar FST. Alphanumeric grammar FSTs can be directed acyclic graphs such as grapheme based acceptor grammars. In the illustrated example, alphanumeric grammar FST 200 accepts the alphanumeric sequence "200" or "202". In some implementations, the character "_" denotes the start of an alphanumeric sequence. For example, alphanumeric grammar FST 200 accepts "_200" and "_202". In the illustrated example, alphanumeric grammar FST 200 begins with vertex 0 and ends with vertex 4. Alphanumeric sequence 200 includes a variety of additional vertices between vertex 0 and vertex 4 including vertex 1, vertex 2, and vertex 3. In the illustrated example, the edge between vertex 0 and vertex 1 represents "_" (i.e., a token indicating the beginning of an alphanumeric sequence). The edge between vertex 1 and vertex 2 represents "2", the first character in the accepted sequence. The edge between vertex 2 and vertex 3 represents "0", the second character in the accepted sequence. Two edges are between vertex 3 and vertex 4. The first edge represents the character "2", the third character in the accepted sequence. The second edge represents the character "0", the third character in the additional sequence accepted by the alphanumeric grammar.

Figure 3:
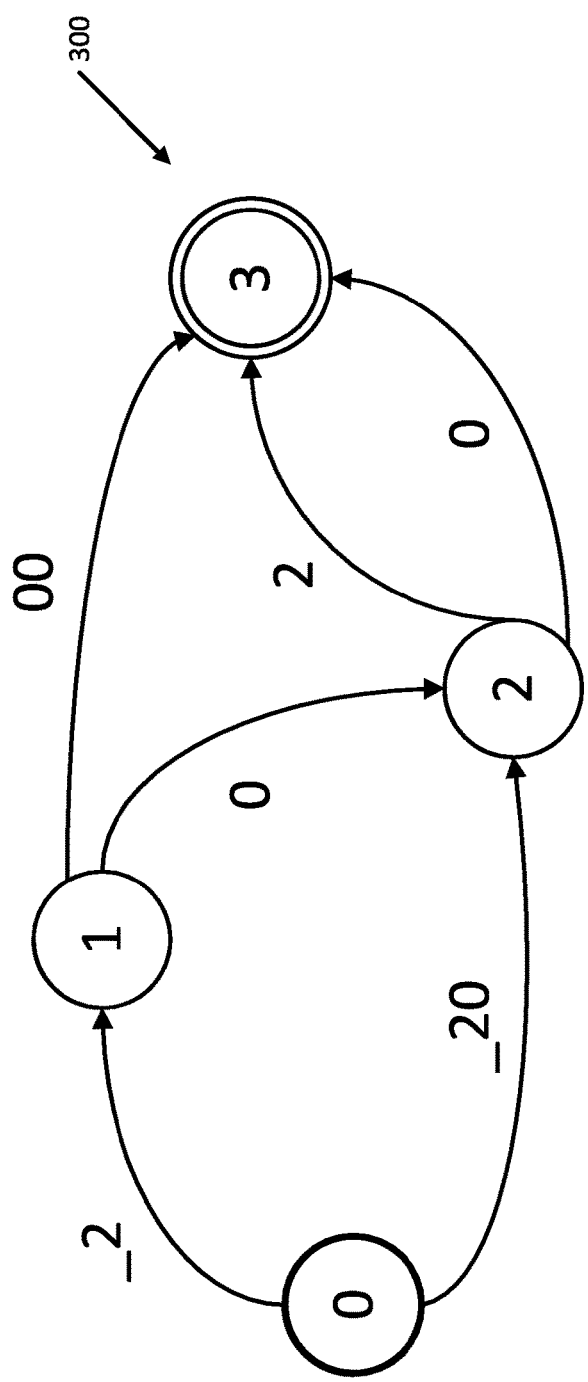
FIG. 3 illustrates an example of an unweighted wordpiece based acceptor grammar in accordance with various implementations disclosed herein.

FIG. 3 illustrates an example unweighted wordpiece based acceptor grammar. In some implementations, unweighted wordpiece based acceptor grammar 300 can be generated by processing the alphanumeric grammar FST 200 of FIG. 2 using a speller FST. The speller FST can map wordpieces to their constituent graphemes. Unweighted wordpiece based acceptor grammar 300 begins with vertex 0 and ends with vertex 3. A variety of additional vertices are between vertex 0 and vertex 3 including vertex 1 and vertex 2. In the illustrated example, the edge between vertex 0 and vertex 1 represents "_2"; the edge between vertex 1 and vertex 3 represents "00"; the edge between vertex 0 and vertex 2 represents "_20"; the edge between vertex 1 and vertex 2 represents "0"; the first edge between vertex 2 and vertex 3 represents "2"; and the second edge between vertex 2 and vertex 3 represents "0". In the illustrate example, unweighted wordpiece based acceptor grammar 300 can accept the strings "2 00", "2 0 0", "20 0", "2 0 2", and "20 2".

Figure 4:
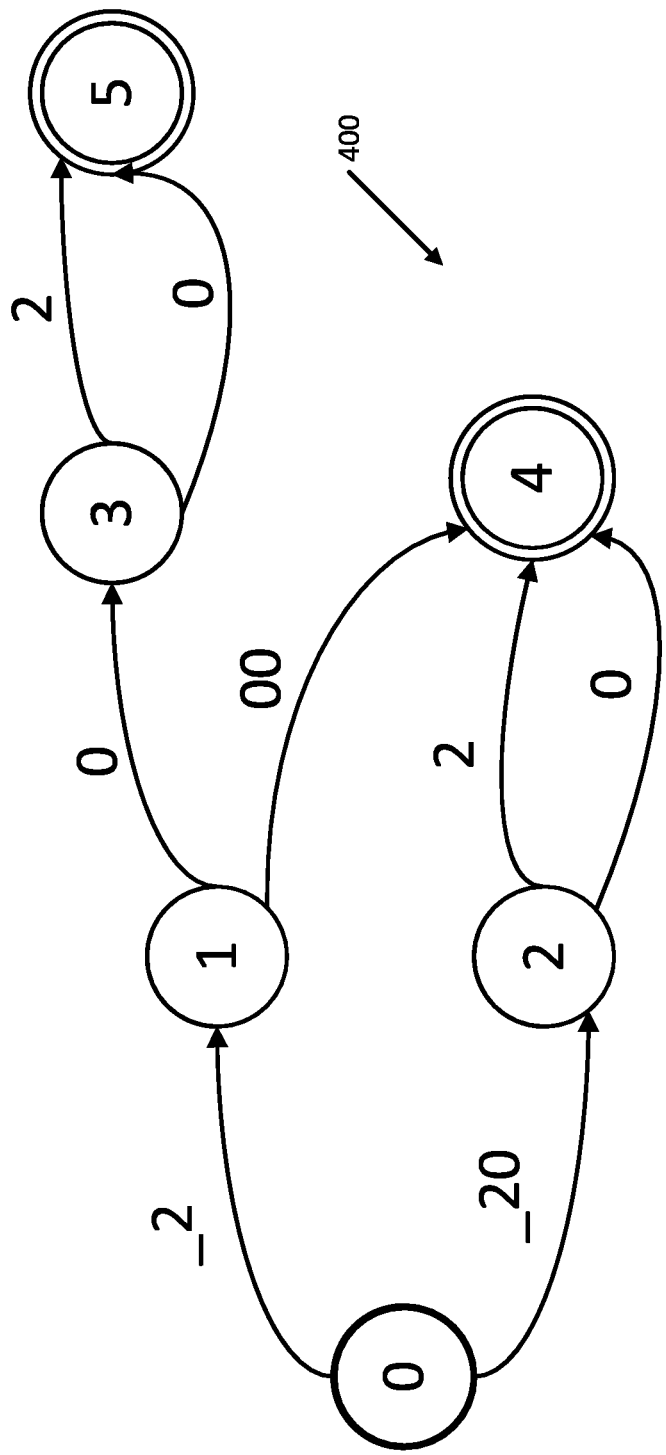
FIG. 4 illustrates an example of a factored FST in accordance with various implementations disclosed herein.
Figure 5:
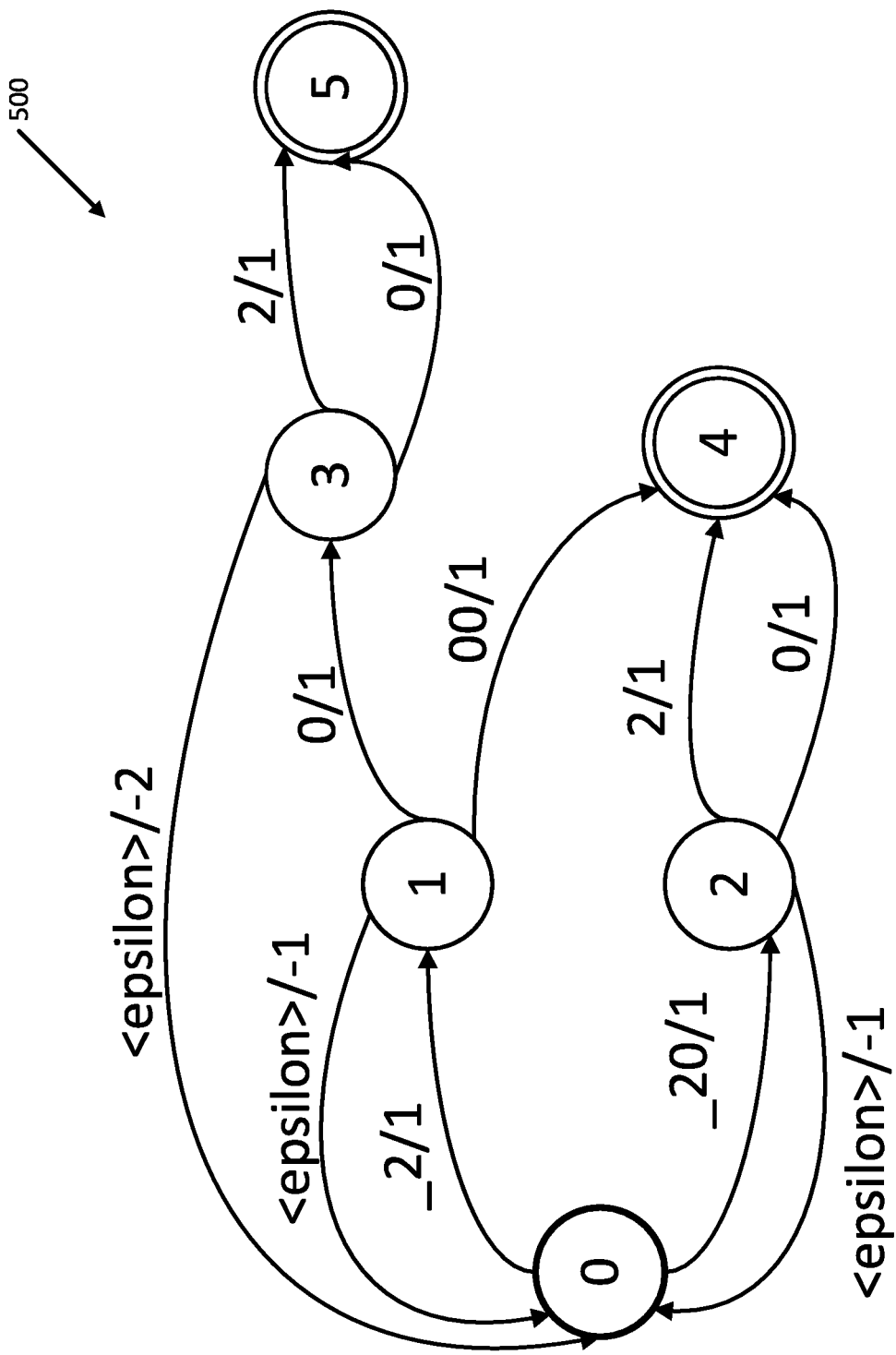
FIG. 5 illustrates an example of a contextual biasing FST in accordance with various implementations disclosed herein.

FIG. 4 illustrates an example factored FST. In the illustrated example, all paths leading to a given state in factored FST 400 have the same length. In some implementations, factored FST 400 is generated by applying a factor operation to unweighted wordpiece based acceptor grammar 300. Factored FST 400 begins with vertex 0 and ends with either vertex 4 or vertex 5. Factored FST 400 also includes vertex 1, vertex 2, and vertex 3. The edge between vertex 0 and vertex 1 represents "_2". The edge between vertex 1 and vertex 3 represents "0". The first edge between vertex 3 and vertex 5 represents "2". The second edge between vertex 3 and vertex 5 represents "0". The edge between vertex 1 and vertex 4 represents "00". The edge between vertex 0 and vertex 2 represents "_20". The first edge between vertex 2 and vertex 4 represents "2". The second edge between vertex 2 and vertex 4 represents "0".

FIG. 5 illustrates an example of a contextual biasing FST. In the illustrated example, contextual biasing FST 500 has a constant weight of 1 per arc. In some implementations, the contextual biasing FST has additional weights per arc (e.g., a constant weight of 2 per arc, a constant weight of 10 per arc, and/or an additional constant weight per arc). Contextual biasing FST 500 can be generated by applying a constant weight per arc and/or failure transitions equal to the cumulative weight accumulated up to a given state of factored FST 400. In some implementations, the weights in contextual FST 500 can be used to modify probabilities during a beam search portion of automatic speech recognition. Contextual biasing FST 500 begins at vertex 0 and ends at either vertex 4 or vertex 5. Additional vertices in contextual biasing FST 500 include vertex 1, vertex 2, and vertex 3. In the illustrated example, an edge between vertex 0 and vertex 1 represents "_2/1", where _2 represents the starting character and the first digit of the accepted number, and 1 represents the weight. The edge between vertex 1 and vertex 3 represents "0/1", where 0 is the second digit of the accepted number and 1 represents the weight. The first edge between vertex 3 and vertex 5 represents "2/1", where 2 is the third digit of the accepted number and 1 represents the weight. The second edge between vertex 3 and vertex 5 represents "0/1", where 0 is the third digit of the accepted number and 1 represents the weight. The edge between vertex 1 and vertex 4 represents "00/1", where 00 are the second and third digits of the accepted number and 1 is the weight. The edge between vertex 0 and vertex 2 represents "_20/1", where _ is the starting character, 20 is the first and second digits of the accepted number, and 1 is the weight. The first edge between vertex 2 and vertex 4 represents "2/1" where 2 is the third digit of the accepted number and 2 is the weight. The second edge between vertex 2 and vertex 4 represents "0/1" where 0 is the third digit of the accepted number and 1 is the weight.

The edge between vertex 1 and vertex 0 represents "<epsilon>/-1" indicating a failure transition of -1. The edge between vertex 3 and vertex 0 represents "<epsilon>/-2" indicating a failure transition of -2. The edge between vertex 2 and vertex 0 represents "<epsilon>/-1" indicating a failure transition of -1.

Figure 6:
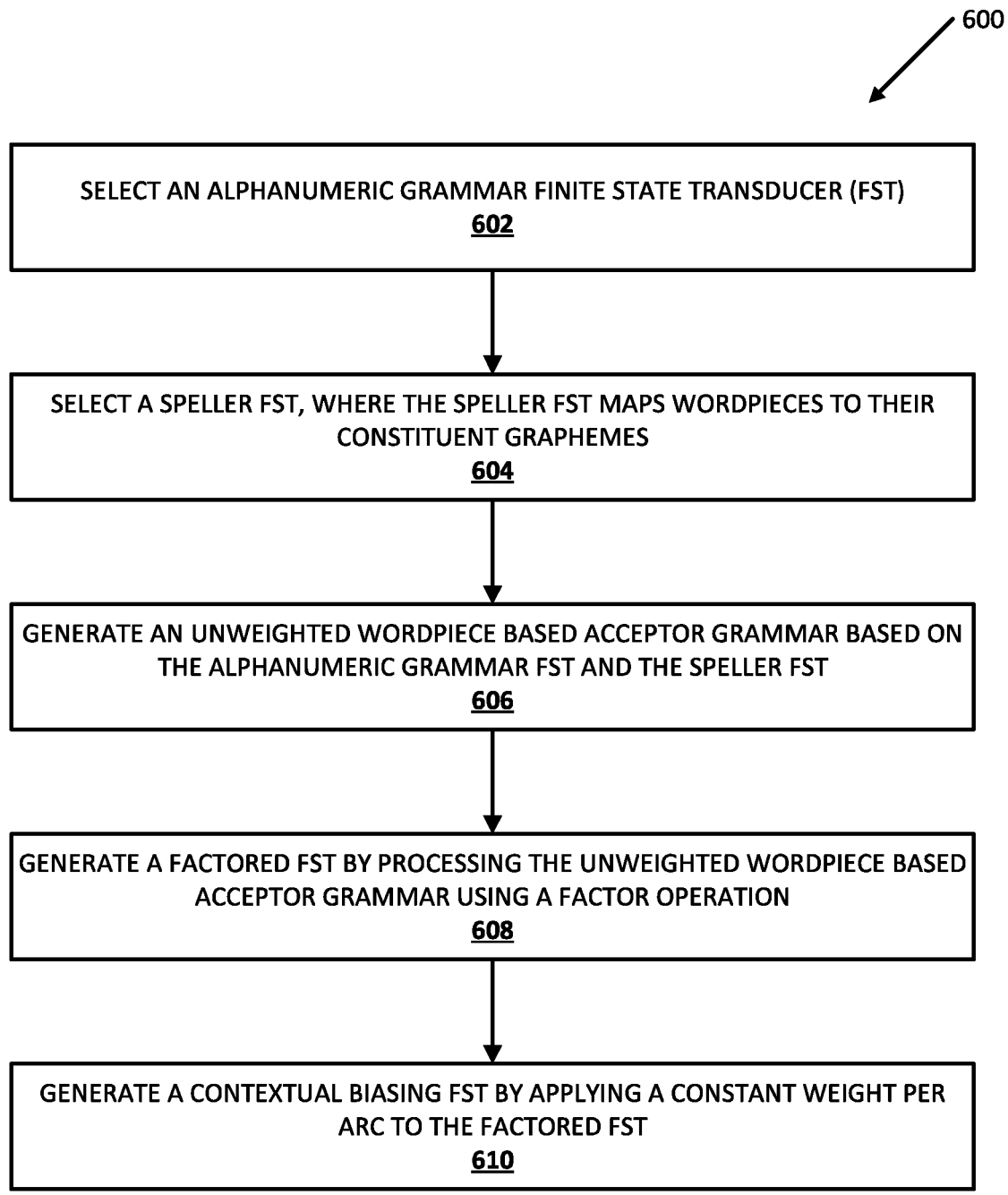
FIG. 6 is a flowchart illustrating an example process in accordance with implementations disclosed herein.

FIG. 6 is a flowchart illustrating a process 600 of generating a contextual biasing FST according to implementations disclosed herein. For convenience, the operations of the flowchart are described with reference to a system that performs the operations. This system may include various components of various computer systems, such as one or more components of client device 152 of FIG. 1B. Moreover, while operations of process 600 are shown in a particular order, this is not meant to be limiting. One or more operations may be reordered, omitted, and/or added.

At block 602, the system selects an alphanumeric grammar FST. In some implementations, the alphanumeric grammar FST is an acyclic character based FST. For example, alphanumeric grammar FST 200 of FIG. 2 accepts the sequences "200" and "202".

At block 604, the system selects a speller FST, where the speller FST maps wordpieces to their constituent graphemes.

At block 606, the system generates an unweighted wordpiece based acceptor grammar FST based on the alphanumeric grammar FST and the speller FST. In some implementations, the system generates the unweighted wordpiece based acceptor grammar FST based on the alphanumeric grammar FST selected at block 602 and the speller FST selected at block 604. For example, unweighted wordpiece based acceptor grammar FST 300 of FIG. 3 can accept the strings "2 00", "2 0 0", "2 0 2", "20 2," and "20 0".

At block 608, the system generates a factored FST by processing the unweighted wordpiece based acceptor grammar using a factor operation. In some implementations, the any path leading to a given state in a factored FST traverses the same number of arcs. Factored FST 400 of FIG. 4 is an example of a factored FST.

At block 610, the system generates a contextual biasing FST by applying a constant weight per act to the factored FST. Contextual biasing FST 500 of FIG. 5 is an example contextual biasing FST.

Figure 7:
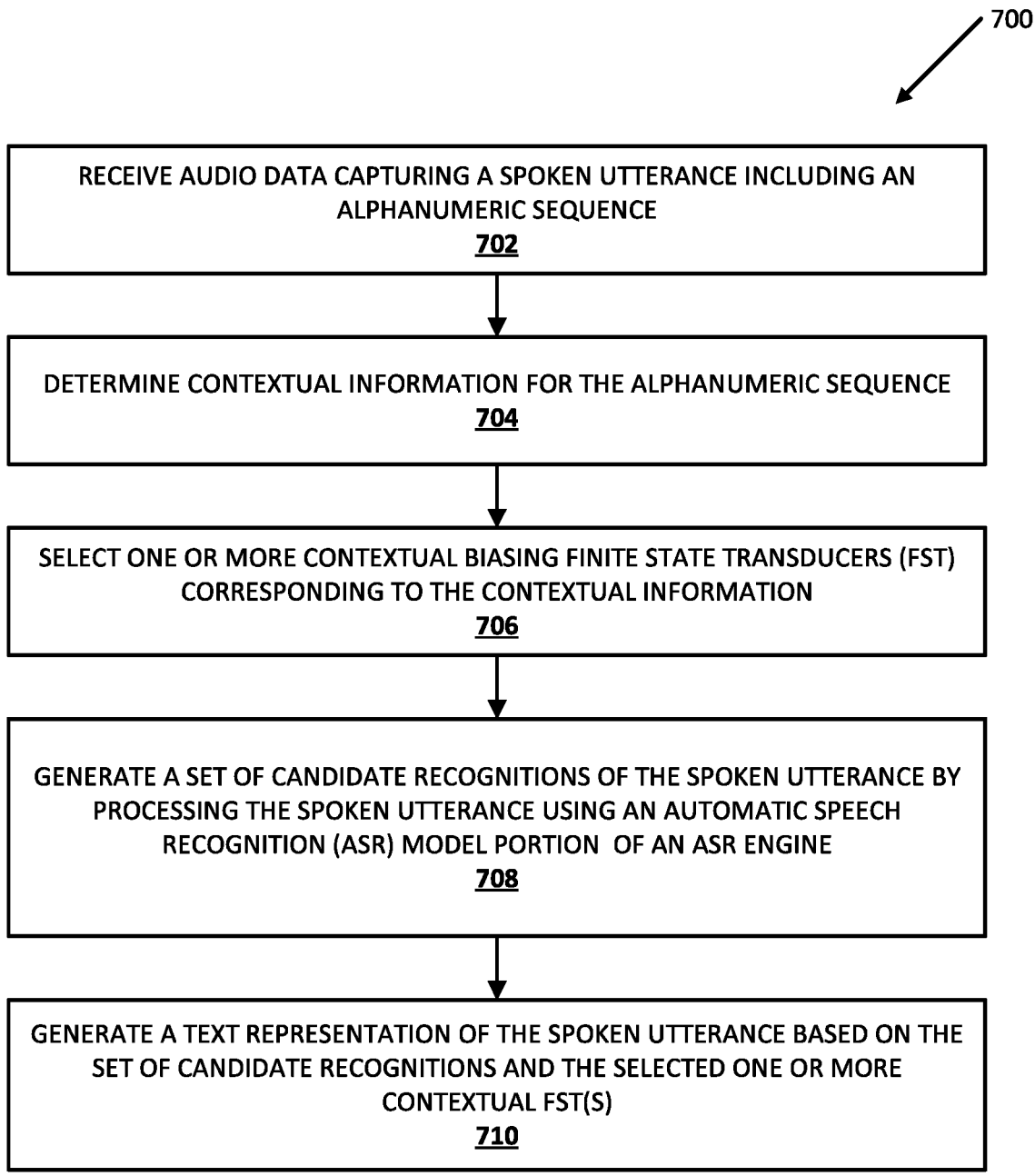
FIG. 7 illustrates another example environment in which implementations disclosed herein can be implemented.

FIG. 7 is a flowchart illustrating a process 700 of generating a generating a text representation of a spoken utterance using a contextual biasing FST according to implementations disclosed herein. For convenience, the operations of the flowchart are described with reference to a system that performs the operations. This system may include various components of various computer systems, such as one or more components of client device 152 of FIG. 1B. Moreover, while operations of process 700 are shown in a particular order, this is not meant to be limiting. One or more operations may be reordered, omitted, and/or added.

At block 702, the system receives audio data capturing a spoken utterance including an alphanumeric sequence. In some implementations, the audio data is captured using a microphone of a client device. For example, the system can receive audio data capturing the spoken utterance of "tell me about my flight to DAY", where DAY is an airport code alphanumeric sequence indicating the Dayton International Airport. As another example, the system can receive audio data capturing the spoken utterance of "when will my package with the tracking number of ABC-123 arrive?".

At block 704, the system determines contextual information for the alphanumeric sequence. In some implementations, the system can determine the contextual information based on the spoken utterance. For example, the system can determine contextual information indicating a tracking number for the spoken utterance "when will my package with the tracking number of ABC-123 arrive". Additionally or alternatively, the system can determine contextual information based on additional information including one or more previous turn in a dialog between a user and a computing system that precede the spoken utterance; information about the user stored in a user profile; information about the computing system; information about one or more networked hardware devices (e.g., a networked smart thermostat, a networked smart oven, a networked camera, etc.); and/or additional information relating to the context of the utterance. For example, a dialog between a user and a computing system can include: user—"when will my package arrive"; computing system—"what is the tracking number of the package" user—"it is ABC-123". Additional information of "what is the tracking number" can be used to generate contextual information relating to a tracking number. As another example, a user profile of the user can include a calendar entry relating to a flight from San Francisco International Airport to Los Angeles International Airport which can be used to determine contextual information relating to a flight. Additionally or alternatively, contextual information relating to a thermostat temperature can be determined based on a smart thermostat associated with the system.

At block 706, the system selects one or more contextual biasing FSTs corresponding to the contextual information. For example, the system can select an airport code contextual biasing FST based on contextual information indicating a flight. In some implementations, the system can select multiple contextual FSTs corresponding to the contextual information. For example, the system can select a Fahrenheit temperature contextual biasing FST and a Celsius temperature contextual biasing FST corresponding to the contextual information indicating smart thermostat temperature. In some implementations, the one or more contextual biasing FSTs can be generated in accordance with process 600 of FIG. 6. In some implementations, the system can select the contextual biasing FST(s) from a predetermined set of contextual FSTs stored locally at a client device. Additionally or alternatively, the system can select the contextual biasing FST(s) from a predetermined set of contextual FSTs stored remotely from the client device on a server. In some implementations, the system can select the contextual biasing FST(s) that are generated on the fly by the system, such as a contextual biasing FST generated on the fly based on a client provided numeric grammar.

At block 708, the system generates a set of candidate recognitions of the spoken utterance including the alphanumeric sequence by processing the spoken utterance using an ASR model portion of an ASR engine. In some implementations, the system can generate a set of candidate recognitions of the spoken utterance by processing the audio data received at block 702 using a RNN-T model.

At block 710, the system generates a text representation of the spoken utterance based on the set of candidate recognitions and the one or more selected contextual FSTs. In some implementations, the system can generate the text representation of the spoken utterance based on the set of candidate recognitions generated at block 708 and the one or more contextual FSTs selected at block 702. For example, a beam search portion of the ASR system can be modified via shallow fusion using the contextual FSTs to change the probabilities of candidate recognitions generated using the ASR model at block 708.

Figure 8:
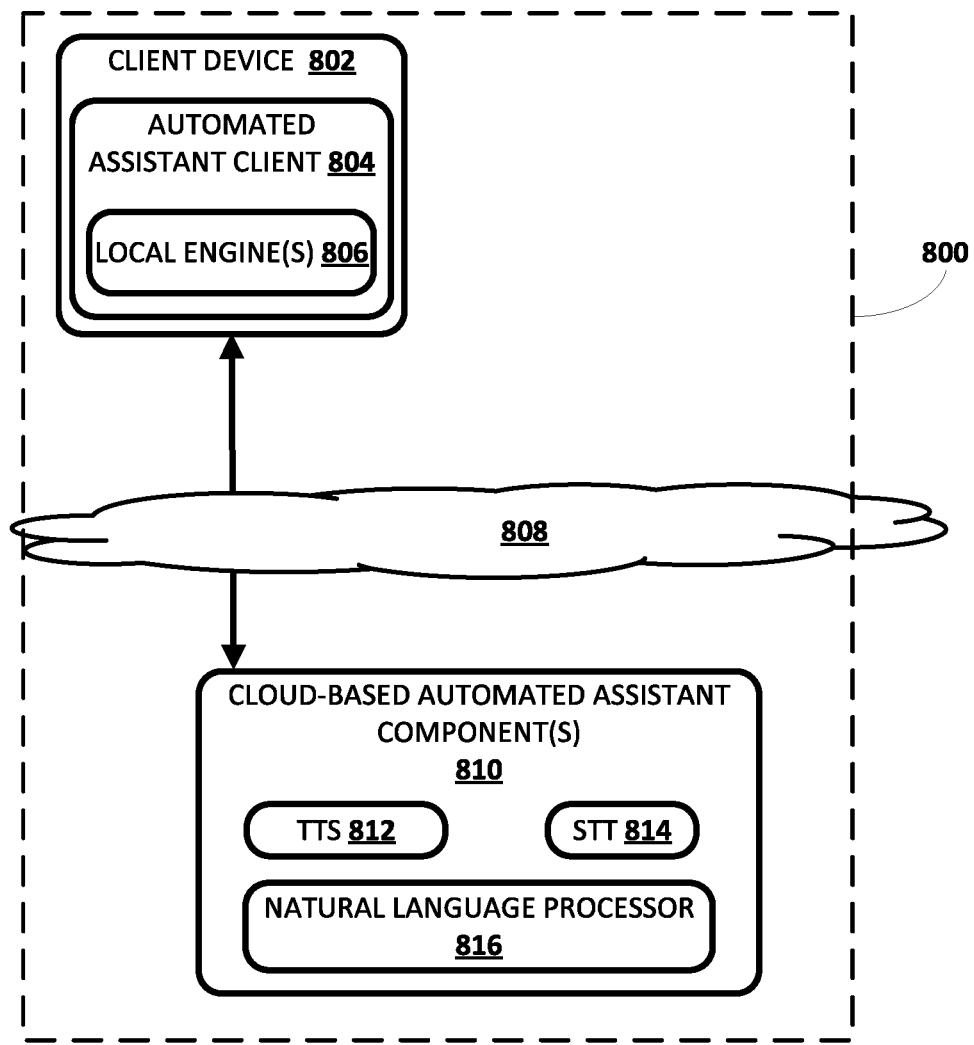
FIG. 8 illustrates another example environment in where various implementations disclosed herein can be implemented.

Turning to FIG. 8, an example environment in which implementations disclosed herein can be implemented. FIG. 8 includes a client computing device 802, which execute an instance of an automated assistant client 804. One or more cloud-based automated assistant components 810 can be implemented on one or more computing systems (collectively referred to as a "cloud" computing system) that are communicatively coupled to client device 802 via one or more local and/or wide area networks (e.g., the Internet) indicated generally at 808.

An instance of an automated assistant client 804, by way of its interactions with one or more cloud-based automated assistant components 810, may form what appears to be, from the user's perspective, a logical instance of an automated assistant 800 with which the user may engage in a human-to-computer dialog. It thus should be understood that in some implementations, a user that engages with an automated assistant client 804 executing on client device 802 may, in effect, engage with his or her own logical instance of an automated assistant 800. For the sakes of brevity and simplicity, the term "automated assistant" as used herein as "serving" a particular user will often refer to the combination of an automated assistant client 804 executing on a client device 802 operated by the user and one or more cloud-based automated assistant components 810 (which may be shared amongst multiple automated assistant clients of multiple client computing devices). It should also be understood that in some implementations, automated assistant 800 may respond to a request from any user regardless of whether the user is actually "served" by that particular instance of automated assistant 800.

The client computing device 802 may be, for example: a desktop computing device, a laptop computing device, a tablet computing device, a mobile smartphone computing device, a standalone interactive speaker, a smart appliance, and/or a wearable apparatus of the user that includes a computing device (e.g., a watch of the user having a computing device, glasses of the user having a computing device, a virtual or augmented reality computing device). Additional and/or alternative client computing devices may be provided. Additionally or alternatively, operations of client computing device 802 may be distributed between multiple computing devices. For example, one or more operations of client computing device 802 may be distributed between a mobile smartphone and a vehicle computing device. Furthermore, operations of client computing device 802 may be repeated between multiple computing devices (which in some cases may be communicatively coupled). As a further example, a mobile smartphone as well as a vehicle interface device may each implement operations of automated assistant 800, such as a mobile smartphone and a vehicle interface device both including an invocation engine (described below). In various implementations, the client computing device 802 may optionally operate one or more other applications that are in additional to automated assistant client 1304, such as a message exchange client (e.g., SMS, MMS, online chat), a browser, and so forth. In some of those various implementations, one or more of the other applications can optionally interface (e.g. via an application programming interface) with the automated assistant 804, or include their own instance of an automated assistant application (that may also interface with the cloud-based automated assistant component(s) 810).

Automated assistant 800 engages in human-to-computer dialog sessions with a user via user interface input and output devices of the client device (not pictured). To preserve user privacy and/or to conserve resources, in many situations a user must often explicitly invoke the automated assistant 800 before the automated assistant will fully process a spoken utterance. The explicit invocation of the automated assistant 800 can occur in response to certain user interface input received at the client device 802. For example, user interface inputs that can invoke the automated assistant 800 via the client device 802 can optionally include actuations of a hardware and/or virtual button of the client device 802. Moreover, the automated assistant client can include one or more local engines 806, such as an invocation engine that is operable to detect the presence of one or more spoken invocation phrases. The invocation engine can invoke the automated assistant 800 in response to detection of one or more of the spoken invocation phrases. For example, the invocation engine can invoke the automated assistant 800 in response to detecting a spoken invocation phrase such as "Hey Assistant", "OK Assistant", and/or "Assistant". The invocation engine can continuously process (e.g., if not in an "inactive" mode) a stream of audio data frames that are based on output from one or more microphones of the client device 802, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 800. As used herein, "invoking" the automated assistant 800 can include causing one or more previously inactive functions of the automated assistant 800 to be activated. For example, invoking the automated assistant 800 can include causing one or more local engines 806 and/or cloud-based automated assistant components 810 to further process audio data frames based on which the invocation phrase was detected, and/or one or more following audio data frames (whereas prior to invoking no further processing of audio data frames was occurring).

The one or more local engine(s) 806 of automated assistant 804 are optional, and can include, for example, the invocation engine described above, a local speech-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 802 is relatively constrained in terms of computing resources (e.g., processor cycles, memory, battery, etc.), the local engines 806 may have limited functionality relative to any counterparts that are included in cloud-based automated assistant components 810.

Automated assistant client 804 can additionally include a context engine and/or FST engine (not depicted). The context engine, such as context engine 104 of FIG. 1A and FIG. 1B, which can be utilized by automated assistant client 804 in determining contextual information based on audio data and/or additional information related to the audio data. The FST engine, such as FST engine 110 of FIG. 1A and FIG. 1B, can be utilized by automated assistant client 804 in selecting one or more contextual biasing FSTs. TTS engine 812 can utilize the one or more selected contextual biasing FSTs in generating a text representation of the audio data, such as by modifying a beam search with the contextual biasing FST(s) via shallow fusion.

Cloud-based automated assistant components 810 leverage the virtually limitless resources of the cloud to perform more robust and/or more accurate processing of audio data, and/or other user interface input, relative to any counterparts of the local engine(s) 806. Again, in various implementations, the client device 802 can provide audio data and/or other data to the cloud-based automated assistant components 810 in response to the invocation engine detecting a spoken invocation phrase, or detecting some other explicit invocation of the automated assistant 800.

The illustrated cloud-based automated assistant components 810 include a cloud-based TTS module 812, a cloud-based STT module 814, and a natural language processor 816. In some implementations, one or more of the engines and/or modules of automated assistant 800 may be omitted, combined, and/or implemented in a component that is separate from automated assistant 800. Further, in some implementations automated assistant 800 can include additional and/or alternative engines and/or modules.

Cloud-based STT module 814 can convert audio data into text, which may then be provided to natural language processor 816. In various implementations, the cloud-based STT module 814 can convert audio data into text based at least in part on indications of speaker labels and assignments that are provided by an assignment engine (not illustrated).

Cloud-based TTS module 812 can convert textual data (e.g., natural language responses formulated by automated assistant 800) into computer-generated speech output. In some implementations, TTS module 812 may provide the computer-generated speech output to client device 802 to be output directly, e.g., using one or more speakers. In other implementations, textual data (e.g., natural language responses) generated by automated assistant 800 may be provided to one of the local engine(s) 806, which may then convert the textual data into computer-generated speech that is output locally.

Natural language processor 816 of automated assistant 800 processes free form natural language input and generates, based on the natural language input, annotated output for use by one or more other components of the automated assistant 800. For example, the natural language processor 816 can process natural language free-form input that is textual input that is a conversion, by STT module 814, of audio data provided by a user via client device 802. The generated annotated output may include one or more annotations of the natural language input and optionally one or more (e.g., all) of the terms of the natural language input. In some implementations, the natural language processor 816 is configured to identify and annotate various types of grammatical information in natural language input. For example, the natural language processor 816 may include a part of speech tagger (not depicted) configured to annotate terms with their grammatical roles. Also, for example, in some implementations the natural language processor 816 may additionally and/or alternatively include a dependency parser (not depicted) configured to determine syntactic relationships between terms in natural language input.

In some implementations, the natural language processor 816 may additionally and/or alternatively include an entity tagger (not depicted) configured to annotate entity references in one or more samples such as references to people (including, for instance, literary characters, celebrities, public figures, etc.), organizations, locations (real and imaginary), and so forth. The entity tagger of the natural language processor 816 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 816 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 816 may rely on annotations from one or more other components of the natural language processor 816. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 816 may use related prior input and/or other related data outside of the particular natural language input to determine one or more annotations.

Figure 9:
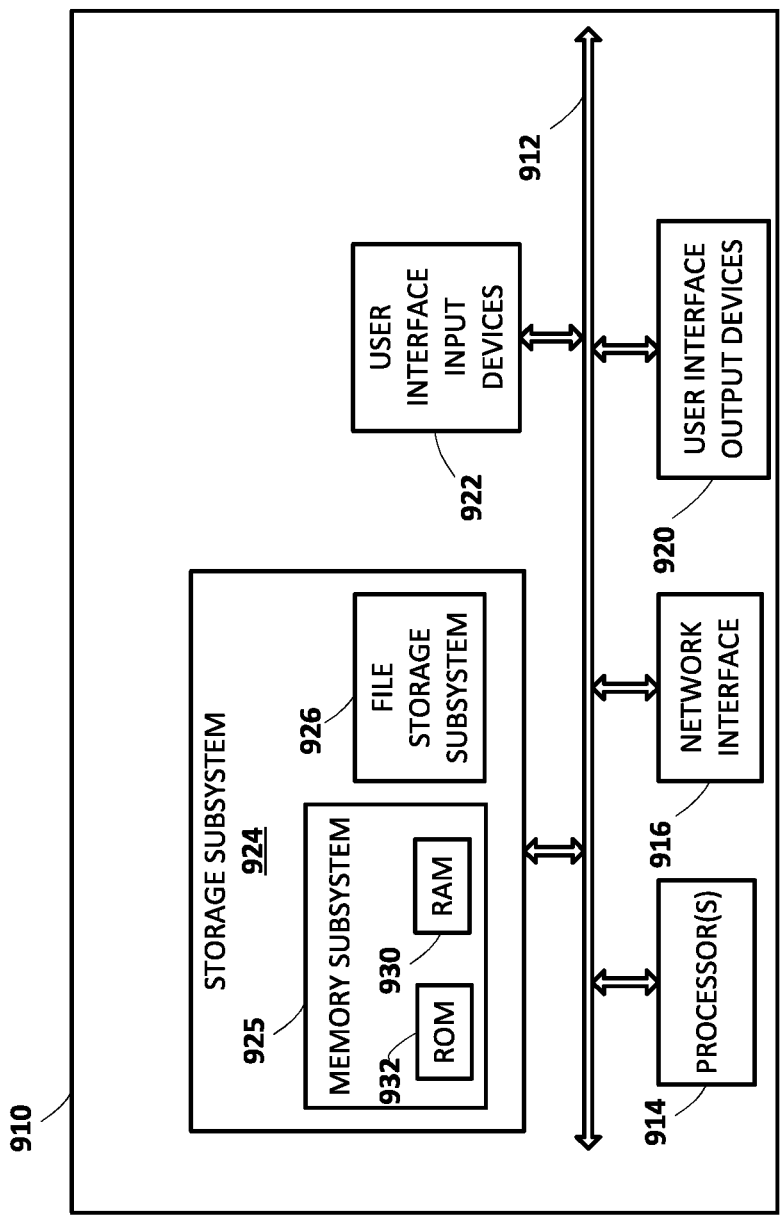
FIG. 9 illustrates an example architecture of a computing device.

FIG. 9 is a block diagram of an example computing device 910 that may optionally be utilized to perform one or more aspects of techniques described herein. In some implementations, one or more of a client computing device, and/or other component(s) may comprise one or more components of the example computing device 910.

Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of one or more of the processes of FIG. 8, as well as to implement various components depicted in FIG. 1B.

These software modules are generally executed by processor 914 alone or in combination with other processors. Memory 925 used in the storage subsystem 924 can include a number of memories including a main random access memory ("RAM") 930 for storage of instructions and data during program execution and a read only memory ("ROM") 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided that includes generating a text representation of audio data capturing a spoken utterance, including an alphanumeric sequence, using an automatic speech recognition ("ASR") engine. In some implementations, generating the text representation of the audio data capturing the spoken utterance, including the alphanumeric sequence, using the ASR engine, includes determining contextual information for the alphanumeric sequence. In some implementations, the method includes selecting, based on the contextual information, one or more contextual finite state transducers for the alphanumeric sequence. In some implementations, the method includes generating a set of candidate recognitions of the spoken utterance based on processing the audio data using an ASR model portion of the ASR engine. In some implementations, the method includes generating the text representation of the spoken utterance, wherein the text representation includes the alphanumeric sequence, and wherein generating the text representation is based on the generated set of candidate recognitions and the one or more selected contextual finite state transducers.

These and other implementations of the technology disclosed herein can include one or more of the following features.

In some implementations, the ASR model is a recurrent neural network transducer (RNN-T) model, and the ASR engine further comprises a beam search portion. In some versions of those implementations, generating the text representation of the spoken utterance based on the generated set of candidate recognitions and the one or more selected contextual finite state transducers includes modifying the beam search portion of the ASR engine using the one or more contextual finite state transducers. In some versions of those implementations, modifying the beam search portion of the ASR engine using the one or more contextual finite state transducers includes modifying, via shallow fusion, the beam search portion of the ASR engine using the one or more contextual finite state transducers. In some versions of those implementations, generating the text representation of the spoken utterance based on the generated set of candidate recognitions and the one or more selected contextual finite state transducers further includes determining a corresponding probability measure for each candidate recognition in the set of candidate recognitions. In some implementations, the method further includes modifying the corresponding probability measures using the beam search portion of the ASR engine modified using the one or more contextual finite state transducers. In some implementations, the method further includes selecting a candidate recognition, from the set of candidate recognitions, based on determining that the corresponding probability measure for the candidate recognition satisfies one or more conditions. In some implementations, the method further includes generating the text representation of the spoken utterance based on the selected candidate recognition.

In some implementations, the audio data is captured via one or more microphones of a client device.

In some implementations, determining the contextual information for the alphanumeric sequence is based on the audio data capturing the spoken utterance, and determining the contextual information for the alphanumeric sequence based on the audio data includes generating the contextual information for the alphanumeric sequence based on one or more recognized terms of the audio data, the one or more recognized terms being in addition to the alphanumeric sequence.

In some implementations, determining the contextual information for the alphanumeric sequence is based on a rendered system prompt that immediately preceded the spoken utterance, and determining the contextual information based on the rendered system prompt includes determining the contextual information based on at least one predicted response to the rendered system prompt.

In some implementations, the method further includes generating at least a given contextual finite state transducer, of the one or more contextual finite state transducers. In some implementations, generating the given contextual finite state transducer includes selecting an alphanumeric grammar finite state transducer corresponding to an alphanumeric sequence. In some implementations, the method further includes selecting a speller finite state transducer which maps wordpieces to constitute graphemes. In some implementations, the method further includes generating an unweighted wordpiece based acceptor grammar based on the alphanumeric grammar finite state transducer and the speller finite state transducer. In some versions of those implementations, generating the given contextual finite state transducers further includes generating a factored finite state transducer based on processing the unweighted wordpiece based acceptor grammar using a factor operation. In some implementations, the method further includes generating the given contextual finite state transducer based on applying a constant weight to each arc in the unweighted wordpiece based acceptor grammar.

In some implementations, the alphanumeric sequence includes at least one number and includes at least one letter.

In some implementations, the ASR model portion of the ASR engine is an end-to-end speech recognition model.

In some implementations, the ASR engine is trained using a set of training instances, and wherein the alphanumeric sequence is not in the set of training instances.

In some implementations, the ASR engine is trained using a set of training instances, and wherein the alphanumeric sequence occurs a number of times, in the set of training instances, that is below a threshold value.

In some implementations, a method implemented by one or more processors is provided that includes generating a contextual finite state transducer for use in modifying one or more probabilities of candidate recognitions of an alphanumeric sequence of a spoken utterance during automatic speech recognition. In some implementations, generating the contextual finite state transducer includes selecting an alphanumeric grammar finite state transducer corresponding to the alphanumeric sequence. In some implementations, the method includes selecting a speller finite state transducer which maps wordpieces to constitute graphemes. In some implementations, the method includes generating an unweighted wordpiece based acceptor grammar based on the alphanumeric grammar finite state transducer and the speller finite state transducer. In some implementations, the method includes generating a factored finite state transducer based on processing the unweighted wordpiece based acceptor grammar using a factor operation. In some implementations, the method includes generating the contextual finite state transducer based on applying a constant weight to each arc in the unweighted wordpiece based acceptor grammar.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:
    generating a text representation of audio data capturing a spoken utterance, including an alphanumeric sequence, using an automatic speech recognition ("ASR") engine, wherein generating the text representation of the audio data capturing the spoken utterance, including the alphanumeric sequence, using the ASR engine, comprises:
        determining contextual information for the alphanumeric sequence, wherein determining the contextual information for the alphanumeric sequence is based on a rendered system prompt that immediately preceded the spoken utterance, and wherein determining the contextual information based on the rendered system prompt comprises:
            determining the contextual information based on at least one predicted response to the rendered system prompt;
        selecting, based on the contextual information, one or more contextual finite state transducers for the alphanumeric sequence;
        generating a set of candidate recognitions of the spoken utterance based on processing the audio data using an ASR model portion of the ASR engine; and
        generating the text representation of the spoken utterance, wherein the text representation includes the alphanumeric sequence, and wherein generating the text representation is based on the generated set of candidate recognitions and the one or more selected contextual finite state transducers.

2. The method of claim 1, wherein the ASR model is a recurrent neural network transducer (RNN-T) model, and wherein the ASR engine further comprises a beam search portion.

3. The method of claim 2, wherein generating the text representation of the spoken utterance based on the generated set of candidate recognitions and the one or more selected contextual finite state transducers comprises:
    modifying the beam search portion of the ASR engine using the one or more contextual finite state transducers.

4. The method of claim 3, wherein modifying the beam search portion of the ASR engine using the one or more contextual finite state transducers comprises:
    modifying, via shallow fusion, the beam search portion of the ASR engine using the one or more contextual finite state transducers.

5. The method of claim 4, wherein generating the text representation of the spoken utterance based on the generated set of candidate recognitions and the one or more selected contextual finite state transducers further comprises:
    determining a corresponding probability measure for each candidate recognition in the set of candidate recognitions;
    modifying the corresponding probability measures using the beam search portion of the ASR engine modified using the one or more contextual finite state transducers;
    selecting a candidate recognition, from the set of candidate recognitions, based on determining that the corresponding probability measure for the candidate recognition satisfies one or more conditions; and
    generating the text representation of the spoken utterance based on the selected candidate recognition.

6. The method of claim 1, further comprising generating at least a given contextual finite state transducer, of the one or more contextual finite state transducers, wherein generating the given contextual finite state transducer comprises:
    selecting an alphanumeric grammar finite state transducer corresponding to the alphanumeric sequence;
    selecting a speller finite state transducer which maps wordpieces to constitute graphemes; and
    generating an unweighted wordpiece based acceptor grammar based on the alphanumeric grammar finite state transducer and the speller finite state transducer.

7. The method of claim 6, wherein generating the given contextual finite state transducers further comprises:
    generating a factored finite state transducer based on processing the unweighted wordpiece based acceptor grammar using a factor operation; and
    generating the given contextual finite state transducer based on applying a constant weight to each arc in the unweighted wordpiece based acceptor grammar.

8. The method of claim 1, wherein the audio data is captured via one or more microphones of a client device.

9. The method of claim 1, wherein determining the contextual information for the alphanumeric sequence is based on the audio data capturing the spoken utterance, and wherein determining the contextual information for the alphanumeric sequence based on the audio data comprises:
    generating the contextual information for the alphanumeric sequence based on one or more recognized terms of the audio data, the one or more recognized terms being in addition to the alphanumeric sequence.

10. The method of claim 1, wherein the alphanumeric sequence includes at least one number and includes at least one letter.

11. The method of claim 1, wherein the ASR model portion of the ASR engine is an end-to-end speech recognition model.

12. The method of claim 1, wherein the ASR engine is trained using a set of training instances, and wherein the alphanumeric sequence is not in the set of training instances.

13. The method of claim 1, wherein the ASR engine is trained using a set of training instances, and wherein the alphanumeric sequence occurs a number of times, in the set of training instances, that is below a threshold value.

14. A method implemented by one or more processors, the method comprising:
generating a contextual finite state transducer for use in modifying one or more probabilities of candidate recognitions of an alphanumeric sequence of a spoken utterance during automatic speech recognition, wherein generating the contextual finite state transducer comprises:
selecting an alphanumeric grammar finite state transducer corresponding to the alphanumeric sequence;
selecting a speller finite state transducer which maps wordpieces to constitute graphemes;
generating an unweighted wordpiece based acceptor grammar based on the alphanumeric grammar finite state transducer and the speller finite state transducer;
generating a factored finite state transducer based on processing the unweighted wordpiece based acceptor grammar using a factor operation; and
generating the contextual finite state transducer based on applying a constant weight to each arc in the unweighted wordpiece based acceptor grammar.

15. A computing system comprising:
one or more processing devices; and
one or more storage devices storing instructions that, when executed by the one or more processing devices, cause the one or more processing devices to perform operations comprising:
generating a text representation of audio data capturing a spoken utterance, including an alphanumeric sequence, using an automatic speech recognition ("ASR") engine, wherein generating the text representation of the audio data capturing the spoken utterance, including the alphanumeric sequence, using the ASR engine, comprises:
determining contextual information for the alphanumeric sequence;
selecting, based on the contextual information, one or more contextual finite state transducers for the alphanumeric sequence;
generating a set of candidate recognitions of the spoken utterance based on processing the audio data using an ASR model portion of the ASR engine; and
generating the text representation of the spoken utterance, wherein the text representation includes the alphanumeric sequence, and wherein generating the text representation is based on the generated set of candidate recognitions and the one or more selected contextual finite state transducers;
generating at least a given contextual finite state transducer, of the one or more contextual finite state transducers, wherein generating the given contextual finite state transducer comprises:
selecting an alphanumeric grammar finite state transducer corresponding to the alphanumeric sequence;
selecting a speller finite state transducer which maps wordpieces to constitute graphemes;
generating an unweighted wordpiece based acceptor grammar based on the alphanumeric grammar finite state transducer and the speller finite state transducer;
generating a factored finite state transducer based on processing the unweighted wordpiece based acceptor grammar using a factor operation; and
generating the given contextual finite state transducer based on applying a constant weight to each arc in the unweighted wordpiece based acceptor grammar.

16. The computing system of claim 15, wherein the ASR model is a recurrent neural network transducer (RNN-T) model, and wherein the ASR engine further comprises a beam search portion.

17. The computing system of claim 16, wherein generating the text representation of the spoken utterance based on the generated set of candidate recognitions and the one or more selected contextual finite state transducers comprises:
modifying the beam search portion of the ASR engine using the one or more contextual finite state transducers.

18. The computing system of claim 17, wherein modifying the beam search portion of the ASR engine using the one or more contextual finite state transducers comprises:
modifying, via shallow fusion, the beam search portion of the ASR engine using the one or more contextual finite state transducers.

19. The computing system of claim 18, wherein generating the text representation of the spoken utterance based on the generated set of candidate recognitions and the one or more selected contextual finite state transducers further comprises:
determining a corresponding probability measure for each candidate recognition in the set of candidate recognitions;
modifying the corresponding probability measures using the beam search portion of the ASR engine modified using the one or more contextual finite state transducers;
selecting a candidate recognition, from the set of candidate recognitions, based on determining that the corresponding probability measure for the candidate recognition satisfies one or more conditions; and
generating the text representation of the spoken utterance based on the selected candidate recognition.

* * * * *